(12) United States Patent
Atur et al.

(10) Patent No.: US 12,591,437 B2
(45) Date of Patent: Mar. 31, 2026

(54) ZERO TOUCH PROVISIONING OF BARE METAL SERVERS WITH RADIO ACCESS NETWORK SOFTWARE

(71) Applicant: Rakuten Symphony, Inc., Tokyo (JP)

(72) Inventors: Sree Nandan Atur, Newark, CA (US); Ravi Kumar Alluboyina, Santa Clara, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/251,056

(22) PCT Filed: Dec. 7, 2022

(86) PCT No.: PCT/US2022/052154
§ 371 (c)(1),
(2) Date: Apr. 28, 2023

(87) PCT Pub. No.: WO2024/123328
PCT Pub. Date: Jun. 13, 2024

(65) Prior Publication Data
US 2025/0291605 A1 Sep. 18, 2025

(51) Int. Cl.
| | |
|---|---|
| *G06F 9/4401* | (2018.01) |
| *G06F 8/65* | (2018.01) |
| *H04L 9/40* | (2022.01) |
| *H04L 41/08* | (2022.01) |
| *H04L 41/0806* | (2022.01) |
| *H04L 41/084* | (2022.01) |
| *H04L 41/0893* | (2022.01) |
| *H04L 41/40* | (2022.01) |

(52) U.S. Cl.
CPC .............. *G06F 9/4416* (2013.01); *G06F 8/65* (2013.01); *H04L 41/0806* (2013.01); *H04L 41/084* (2013.01); *H04L 41/0883* (2013.01); *H04L 41/0893* (2013.01); *H04L 41/40* (2022.05); *H04L 63/18* (2013.01)

(58) Field of Classification Search
CPC .............. H04L 41/0806; H04L 41/084; H04L 41/0883; H04L 41/0893; H04L 41/40; H04L 63/18; G06F 9/4416; G06F 8/65
See application file for complete search history.

(56) References Cited

U.S. PATENT DOCUMENTS

| | | | |
|---|---|---|---|
| 7,535,856 | B2 | 5/2009 | Booth, III |
| 7,949,677 | B2 | 5/2011 | Croft |
| 8,051,180 | B2 | 11/2011 | Mazzaferri |
| 9,037,112 | B2 | 5/2015 | Rajadurai |
| 9,325,575 | B2 | 4/2016 | Gray |
| 9,615,224 | B2 | 4/2017 | Dumov |
| 9,712,538 | B1 | 7/2017 | Vincent |
| 10,819,574 | B2 | 10/2020 | Peng |

(Continued)

*Primary Examiner* — Terrell S Johnson
(74) *Attorney, Agent, or Firm* — David R. Stevens; Stevens Law Group

(57) ABSTRACT

Systems and methods for zero touch provisioning of a bare metal server to run radio access network (RAN) software. A method includes delivering a network boot program to a bare metal server in a preboot execution environment and causing the bare metal server to execute the network boot program. The method includes registering the bare metal server with a data center automation platform and instantiating a radio access network (RAN) application on the bare metal server.

19 Claims, 15 Drawing Sheets

(56)        References Cited

U.S. PATENT DOCUMENTS

| 10,819,679 B2 | 10/2020 | Peng |
| 11,095,517 B2 | 8/2021 | Chunduru Venkata |
| 11,128,612 B1 | 9/2021 | Loladia |
| 11,153,155 B1 | 10/2021 | Perez |
| 11,323,325 B1 * | 5/2022 | Hullahalli ........... H04L 41/0806 |
| 2016/0241701 A1 | 8/2016 | Gray |
| 2019/0334909 A1 | 10/2019 | Schmitt |
| 2020/0059420 A1 * | 2/2020 | Abraham ............ H04L 41/0843 |
| 2021/0004292 A1 | 1/2021 | Zlotnick et al. |
| 2021/0392039 A1 * | 12/2021 | Atur ........................ H04L 67/34 |
| 2022/0311837 A1 | 9/2022 | Gupta et al. |
| 2022/0345362 A1 | 10/2022 | Hullahalli et al. |
| 2022/0386393 A1 * | 12/2022 | Tamvada ............. H04W 48/18 |

* cited by examiner

200

300

400

500

900

700

| Applications <u>718</u> |
|---|

| Orchestration Platform <u>716</u> |
|---|

| RPM, Drivers, Services, Configurations <u>714</u> |
|---|

| Operating System <u>712</u> |
|---|

| Network Configuration <u>710</u> |
|---|

| Storage Configuration <u>708</u> |
|---|

| Firmware Upgrades <u>706</u> |
|---|

| BIOS Configurations <u>706</u> |
|---|

Bare Metal
Server
<u>122</u>

800

Select Operating System ISO And Upload To MDCAP File Store 802

Obtain MDCAP URL For The Operating System ISO File 804

Prepare Kickstart File With Relevant Pre- And Post- Sections 806

Implement Application Profile Requirements 808

Embed MDCAP Client 810

Prepare IPXE Program 812

Compile IPXE Program 814

Extensible Firmware Interface 816

800

Implement Application Profile Requirements 808

| RAN Vendor Distributed Unit Profile 818 | RAN Vendor Central Unit Profile 820 | Generic Profile 822 |
|---|---|---|
| Configure BIOS Settings 824 | Configure BIOS Settings 824 | Configure BIOS Settings 824 |
| Upgrade Firmware For Hardware Components To Relevant Version 826 | Upgrade Firmware For Hardware Components To Relevant Version 826 | Upgrade Firmware For Hardware Components To Relevant Version 826 |
| Configure Storage 828 | Configure Storage 828 | Configure Storage 828 |
| Configure Network 830 | Configure Network 830 | Configure Network 830 |
| Install Additional Real-Time OS Packages 832 | Install Additional RPM, Drivers, Packages, Services 834 | Install Additional RPM, Drivers, Packages, Services 834 |
| Install Additional RPM, Drivers, Packages, Services 834 | | |
| Install Additional Configurations With One-Time Updates 836 | | |

Rack And Stack 1002

DHCP Discover Broadcast 1004

Receives IP Address 1006

Downloads NBP 1012

PXE/HTTP Boot 1010

Accepts IP Address 1008

Executes NBP 1014

BIOS Ready 1016

Firmware Ready 1018

Discover BMC IP Address From Host Network 1022

Operating System Ready 1020

1000

1100

Delivering A Network Boot Program To A Bare Metal Server In A Preboot Execution Environment. 1102

Causing The Bare Metal Server To Execute The Network Boot Program. 1104

Registering The Bare Metal Server With A Data Center Automation Platform. 1106

Instantiating A Radio Access Network (RAN) Application On The Bare Metal Server. 1108

ZERO TOUCH PROVISIONING OF BARE METAL SERVERS WITH RADIO ACCESS NETWORK SOFTWARE

TECHNICAL FIELD

This disclosure relates generally to configuring network systems and specifically relates to zero touch provisioning of a bare metal server to run radio access network (RAN) software.

SUMMARY

Systems and methods for zero touch provisioning of a bare metal server to run radio access network (RAN) software. A method includes delivering a network boot program to a bare metal server in a preboot execution environment and causing the bare metal server to execute the network boot program. The method includes registering the bare metal server with a data center automation platform and instantiating a radio access network (RAN) application on the bare metal server.

BACKGROUND

Numerous industries benefit from and rely upon cloud-based computing resources to store data, access data, and run applications and tasks based on the stored data. These systems often rely on storage and processing resources of numerous bare metal servers. In traditional systems, it is computationally expensive and time consuming to install an operating system on a new bare metal server and configure the new bare metal server for use. Additionally, these traditional systems must endure server downtime when servers are being provisioned and configured.

Traditional systems implement zero touch provisioning of bare metal servers using PXE (preboot execution environment). However, these traditional systems only provide a means for installing an operating system on the bare metal servers. It can be challenging and computationally expensive to run radio access network (RAN) software on a bare metal server in the form of containers or virtual machines. Additionally, different RAN vendors have different requirements for hardware, software, and firmware. There is no existing single product capable or orchestrating, configuring, and monitoring RAN software irrespective of server vendor or RAN vendor.

In view of the foregoing, disclosed herein are systems, methods, and devices for zero touch provisioning of bare metal servers with RAN software.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 8A and 8B are schematic block diagrams of a process flow for preparing a network boot program for zero touch provisioning of a bare metal server;

DETAILED DESCRIPTION

Figure 1:
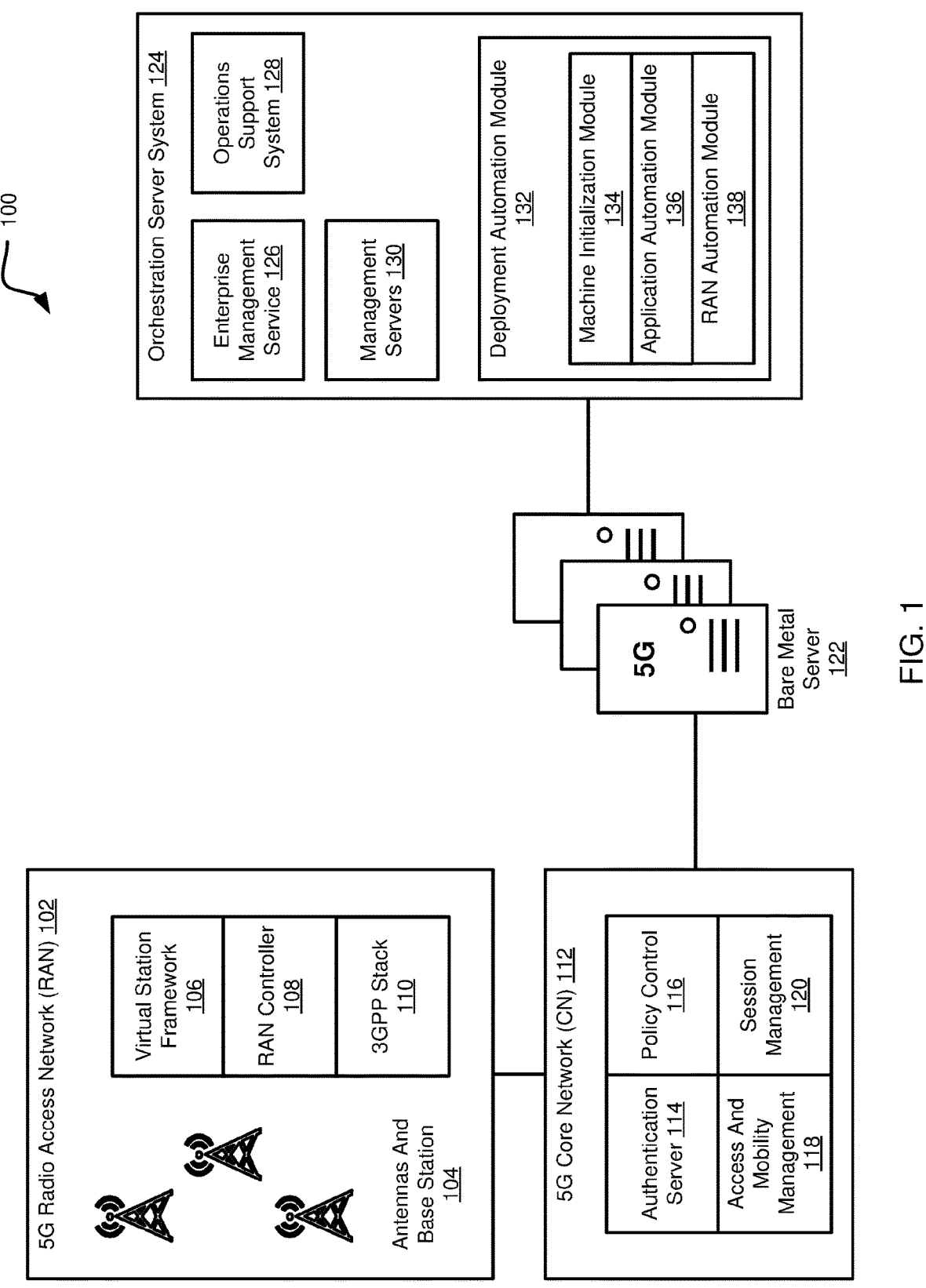
FIG. 1 is a schematic block diagram of a network environment in which the systems and methods described herein may be used.

Disclosed herein are systems, methods, and devices for zero touch provisioning of a bare metal server for running radio access network (RAN) software. Traditional systems fail to provide a single solution for bringing up, orchestrating, configuring, and monitoring RAN software using a bare bones bare metal server. Additionally, these traditional systems lack the flexibility to change a RAN vendor on existing operational servers, adjust configurations based on server manufacturer, and adjust an operating system for business purposes or cost purposes. The disclosures presented herein address some of these deficiencies known in traditional systems.

In traditional systems, when zero-touch provisioning is initiated on the device side, orchestration products are unaware of the bare metal server connectivity with IP address, username, and password. The zero-touch provisioning systems and methods described herein tap into the default boot process for a bare metal server and then take control.

As described herein, the bare metal server is provisioned using a network boot program, and the network boot program can be highly customized depending on the RAN vendor, the server manufacturer, the intended operating system, and so forth. The network boot program delivers infrastructure orchestration that handles firmware upgrades, operating system installation, driver configurations, services configurations, and so forth for the bare metal server. The network boot program may be generic for all bare metal servers.

The zero-touch provisioning processes described herein further include preparing a DHCP (dynamic host configuration protocol) server to deliver the network boot program to the bare metal server by way of a network connection, such as a cabled LAN (local area network) or WAN (wide area network) connection. The DHCP server delivers the network boot program without relying on local storage resources such as a floppy disc, compact disk, hard drive, and so forth. When the bare metal server undergoes a PXE boot and thus enters the preboot extension environment, the DHCP server delivers the network boot program to the bare metal server. The bare metal server then executes the network boot program. Upon concluding the network boot program, a client registers the bare metal server with a multi-data center automation platform (MDCAP).

Upon registration to the MDCAP 204, the MDCAP 204 triggers one or more workflows to bring up a cloud native platform and RAN software for the bare metal server. The cloud native platform may include a platform for executing containerized workloads, such as the KUBERNETES® platform. The RAN software configures the bare metal server for communicating with core network, such as a 5G core network. When the RAN software is ready, the bare metal server is configured a monitored for day-to-day operations.

The systems, methods, and devices described herein offer increased flexibility, simplicity, and operational cost savings over traditional systems. The provisioning systems described herein are completely flexible in changing, for example, a RAN vendor, a server manufacture, firmware versions, operating systems, configurations, and so forth. Thus, hardware, software, and firmware can be changed in day zero through day N operations. Additionally, the provisioning systems described herein significantly reduce the time required to provision a bare metal server and bring up RAN software. In the provisioning systems described herein, it typically takes about one hours to bring up RAN software by racking and stacking a bare bones bare metal server. After this is complete, the provisioning process is completely hands free. Additionally, the systems and methods described herein enable significant operational cost saves because operations are entirely automated and require no truck rolls.

Referring now to the figures, FIG. 1 is a schematic illustration of a system 100 in which the systems and methods disclosed herein may be used.

The system 100 includes a 5G radio access network (RAN) 102 that includes a number of antennas and base stations 104. The 5G RAN 102 includes a virtual station framework 106, RAN controller 108, and 3GPP stack 110. The 5GRAN 102 communicates with a 5G core network (CN) 112. The 5G CN 112 includes an authentication server 114 along with functionality for policy control 116, access and mobility management 118, and session management 120.

The system 100 includes a number of bare metal servers 122 in communication with the 5G CN 112. The bare metal servers 122 comprise processing and memory resources configured to execute an orchestration server system 124. The orchestration server system 124 includes an enterprise management service 126, operations support system 128, management serves 130, and a deployment automation module 132.

A radio access network (RAN) is a component of a mobile telecommunication system. RANG implements a radio access technology (RAT) such as Bluetooth®, Wi-Fi®, global system for mobile communications (GSM), universal mobile telecommunication system (UMTS), long-term evolution (LTE), or 5G NR. Some of the systems, methods, and devices described herein are specifically directed to provisioning bare metal servers for communicating over a 5G NR network. Conceptually, a RAN resides between a device such as a mobile phone, computer, or any remotely controller machine, and provides connection with a core network (CN). Depending on the standard, mobile phones and other wireless connected devices are varyingly known as user equipment (UE), terminal equipment, mobile station (MS), and so forth. RAN functionality is typically provided by a silicon chip residing in both the core networks as well as the user equipment.

The orchestration server system 124 executes centralized management services used to manage the bare metal servers 122. Specifically, the orchestration server system 124 executes enterprise management services 126, operations support systems (OSS) 128, and one or more management servers 130 for services implemented on the bare metal servers 122. The orchestration server system 124 executes a deployment automation module 132 that facilitates deployment of the bare metal servers 122, and the services executing on the bare metal servers 122.

The deployment automation module 132 includes a machine initialization module 134 that detects and initializes hardware within the system 100. The hardware may include computing and storage devices for implementing the baseboard units 106 or the bare metal servers 122. For example, given a computing device configured with an IP address, the machine initialization module 134 may initialize the BIOS (basic input output system), install an operating system, configure the operating system to connect to a network and to the orchestration server system 124, and install an agent for facilitating installation of services and for performing management functions on the computing device at the instruction of the deployment automation module 132. For example, the machine initialization module 134 may use COBBLER in order to initialize the computing device.

The machine initialization module 134 may also discover computing devices on a network and generate a topology of the devices, such as in the form of a directed acyclic graph (DAG). The deployment automation module 132 may then use this DAG to select computing devices for implementing network services and in order to configure a machine to receive installation of a network service.

The deployment automation module 132 may include an application automation module 136 that automates the deployment of an application, such as a container executing an application on a computing device. The application automation module 136 may implement methods and systems described below relating to the automated deployment and management of applications.

One example application of the systems and methods disclosed herein is a radio area network (RAN) automation module 138 that performs the automated deployment of a network service in the illustrated network environment, including instantiating, configuring, and managing services executing on the bare metal servers 122 and the orchestration server system 124 order to implement a RAN in a one-click automated fashion.

Figure 2:
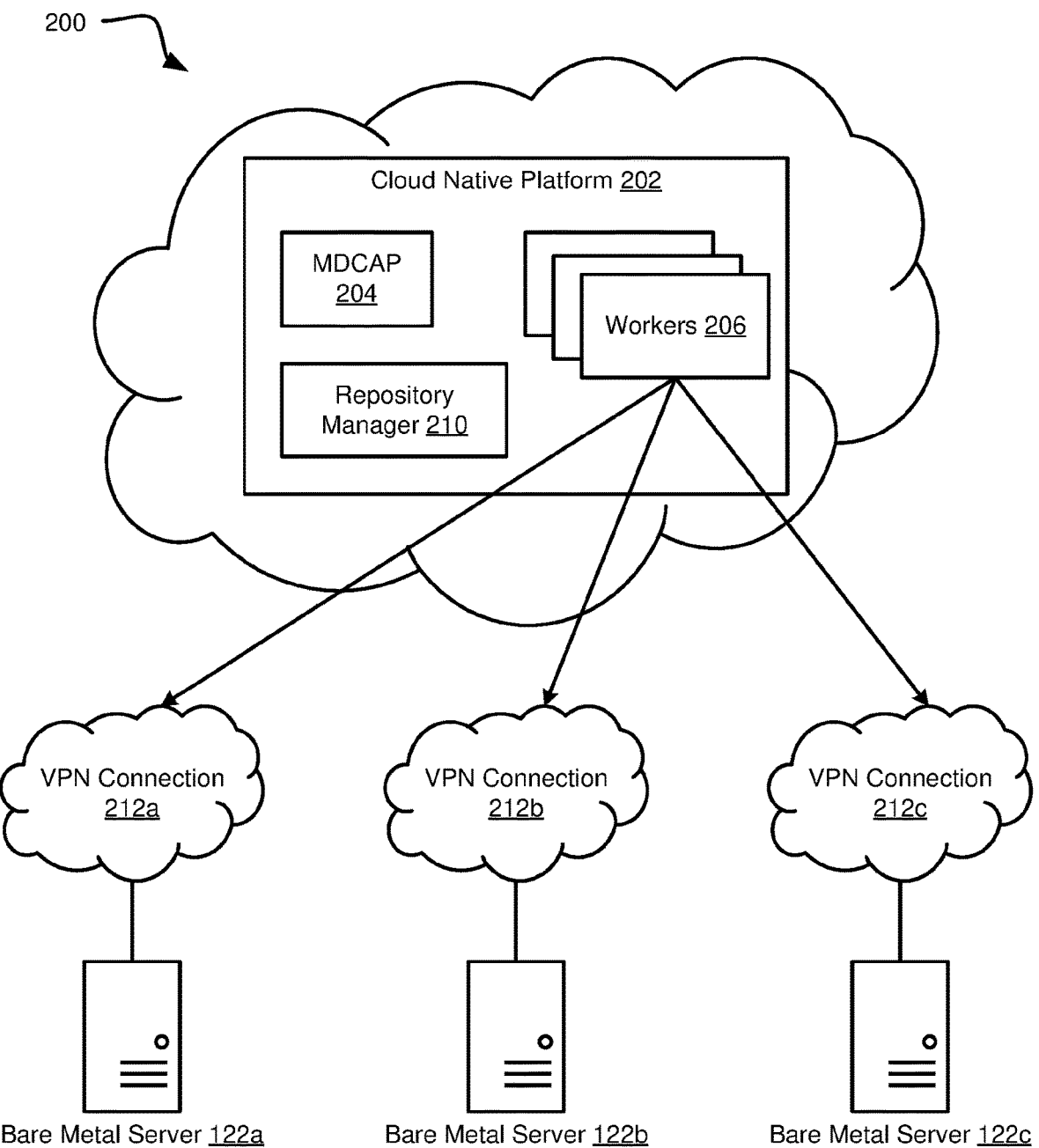
FIG. 2 is a schematic block diagram of a system comprising a cloud native application in communication with multiple bare metal servers.

FIG. 2 is a schematic block diagram of a system 200 for remotely orchestrating bare metal servers. The system 200 includes a cloud native platform 202 comprising a plurality of workers 206 executing an instance of a multi-data center automation platform (MDCAP) 204. The cloud native platform 202 further includes an instance of a repository manager 208. The workers 206 communicate with a plurality of bare metal servers 122a-122c by way of dedicated VPN connections 212a-212c.

The MDCAP 204 is installed on a cloud-based instance of computing system. The MDCAP 204 may be installed on an edge server associated with the orchestration server system 124 described herein. The MIDCAP 204 may be executed by one or more clusters within a containerized workload management system, such as the KUBERNETES® system described herein. In some implementations, and depending on the client's needs, the MDCAP 204 may provide a software as a service (Saas) solution running on an outside database platform such as Amazon Web Services® or Google Kubernetes Engine®.

The bare metal servers 122a, 122b, 122c (may collectively be referred as bare metal servers 122 as described herein) are located remote from the computing resources for the cloud native platform 202. The bare metal servers 122 may specifically be located on-premises at a location associated with a client. This is in contrast with a server group managed by an outside entity such as Amazon Web Services® or Google Kubernetes Engine®. Each bare metal server 122 is associated with a client that utilizes the MIDCAP BMaaS functionality executed by the MDCAP 204.

The clients associated with the bare metal servers 122 provide the necessary VPN connections 212a, 212b, 212c (may collectively be referred to as a VPN connection 212 as described herein) to the workers 206 executing the MIDCAP 204. The VPN connections 212 enable the workers 206 to reach the corresponding bare metal server 122.

The MIDCAP 204 onboards users with a username and password. A registered user may register a bare metal server 122 with the MDCAP 204 by providing a baseboard management controller (BMC) IP address, BMC username, BMC password, and VPN credentials for the bare metal server 122. The user may then instruct the MIDCAP 204 to install on operating system on the bare metal server 122.

The system 200 enables a virtually frictionless means to onboard new clients and configure remote bare metal servers 122 associated with the newly onboarded clients. In traditional systems, the onboarding system must touch the client's DHCP server, TFTP server, and HTTP server to store and serve operation system images.

Figure 3:
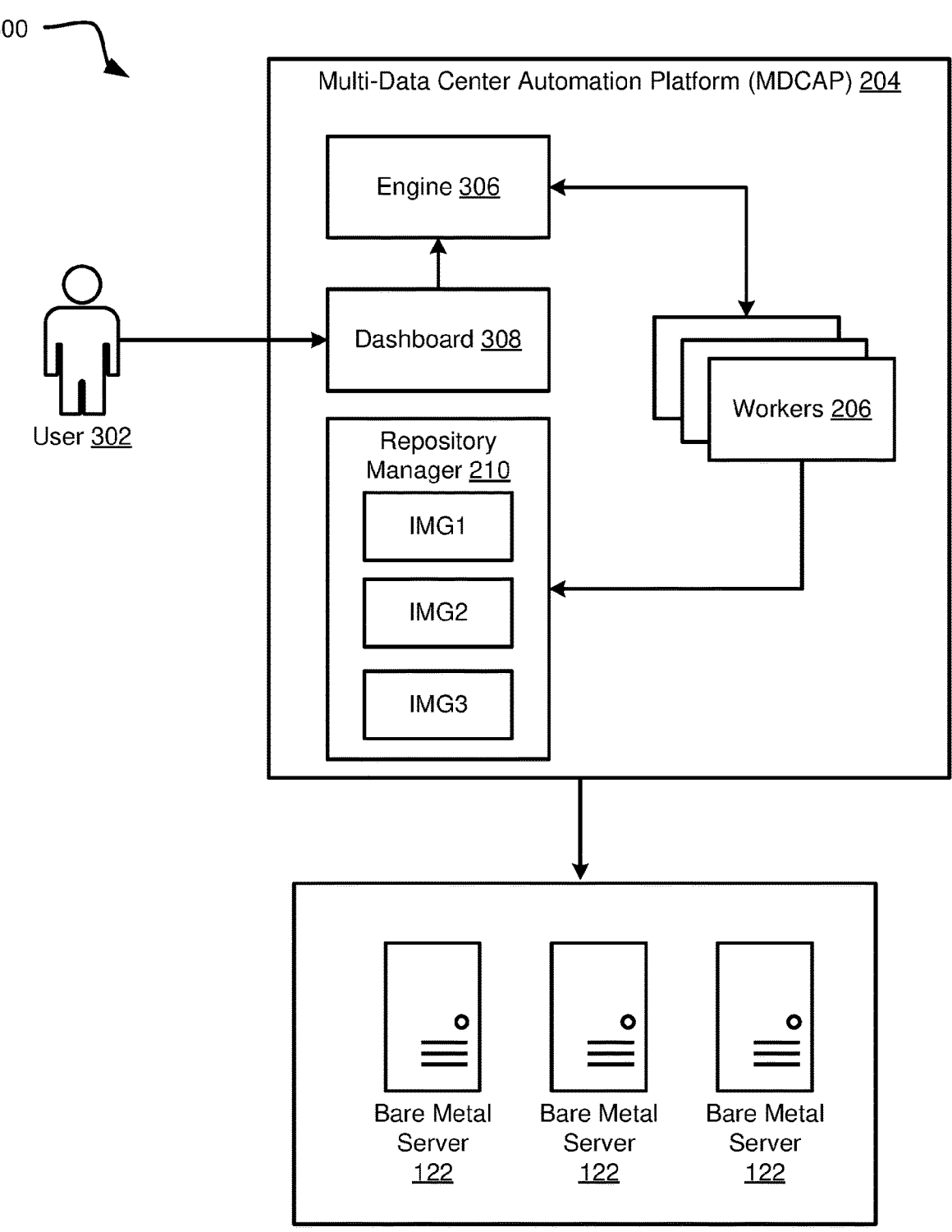
FIG. 3 is a schematic block diagram of a system for managing bare metal servers with a multi-data center automation platform.

FIG. 3 is a schematic block diagram of a system 300 registering a bare metal server 122 with an MDCAP 204 for managing the bare metal server 122 and connecting the bare metal server 122 to one or more clusters of a containerized workload management system.

The MDCAP 204 includes an engine 306 and a dashboard 308. The MDCAP 204 renders the dashboard on a user interface 308 accessible by the user 302. The MDCAP 204 includes or communicates with a plurality of workers 206, which may include compute nodes within a containerized workload management system. The MDCAP 204 includes or accesses a repository manager 210 that manages binary resources for the MIDCAP 204.

The repository manager 210 serves as a central hub for integrating with tools and processes to improve automation of the system 300 and increase system 300 integrity. In some implementations, the repository manager 210 is implemented as an ARTIFACTORY. The repository manager 210 organizes binary resources, including, for example, remote artifacts, proprietary libraries, third-party resources, and so forth. The repository manager 300 pulls these resources into a single centralized location for a plurality of bare metal servers 122.

The repository manager 300 manages and automates artifacts and binaries from start to finish during the application delivery process. The repository manager 300 enables the option to select from different software build packages, major CI/CD (continuous integration/continuous development) systems, and other development tools. The repository manager 300 may be implemented within a KUBERNETES containerized system with a DOCKER registry with full REST APIs 502 as discussed herein. The repository manager 300 supports containers, Helm charts, and DOCKER.

Figure 4A:
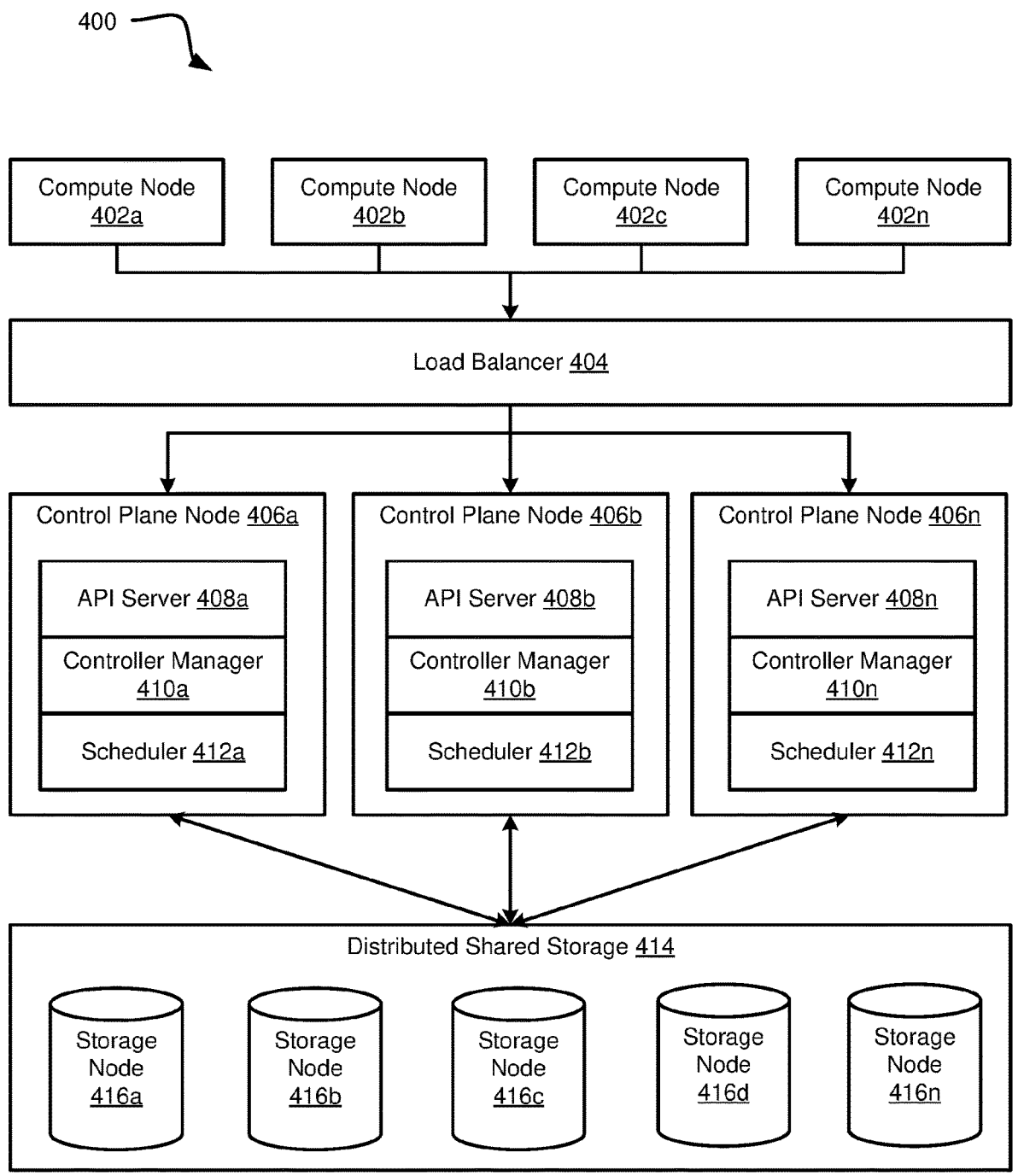
FIG. 4A is a schematic block diagram of a system for containerized workload management and execution comprising a distributed shared storage resource.
Figure 4B:
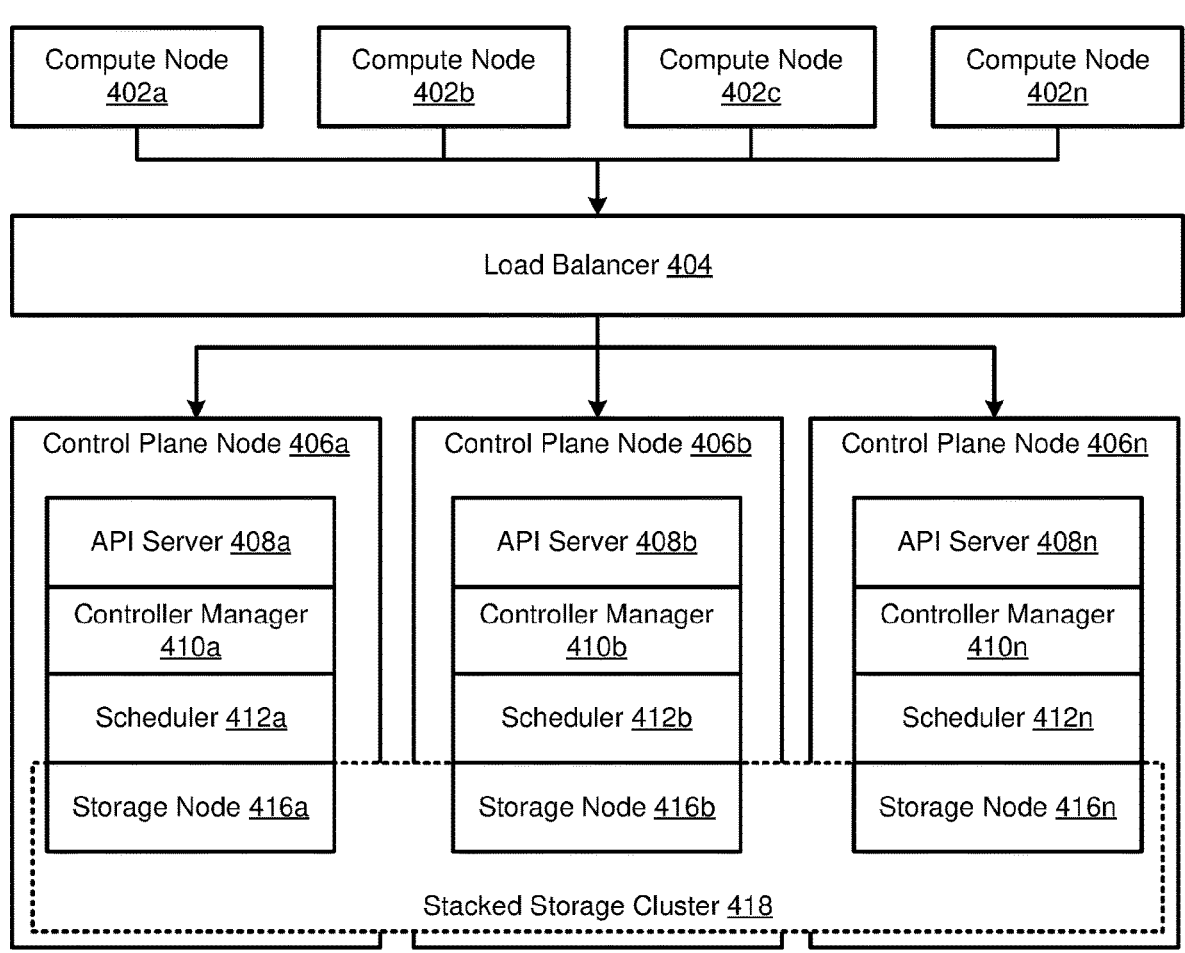
FIG. 4B is a schematic block diagram of a system for containerized workload management and execution comprising a stacked storage cluster.

FIGS. 4A and 4B are schematic illustrations of an example system 400 for automated deployment, scaling, and management of containerized workloads and services. The processes described herein for zero touch provisioning of a bare metal server 122 may be implemented to connect the bare metal server 122 with a containerized system such as those described in connection with FIGS. 4A-4B. The system 400 facilitates declarative configuration and automation through a distributed platform that orchestrates different compute nodes that may be controlled by central master nodes. The system 400 may include "n" number of compute nodes that can be distributed to handle pods.

The system 400 includes a plurality of compute nodes 402a, 402b, 402c, 402n (may collectively be referred to as compute nodes 402 as discussed herein) that are managed by a load balancer 404. The bare metal servers 122 described herein may be implemented within the system 400 as a compute node 402. The load balancer 404 assigns processing resources from the compute nodes 402 to one or more of the control plane nodes 406a, 406b, 406n (may collectively be referred to as control plane nodes 406 as discussed herein) based on need. In the example implementation illustrated in FIG. 4A, the control plane nodes 406 draw upon a distributed shared storage 114 resource comprising a plurality of storage nodes 416a, 416b 416c, 416d, 416n (may collectively be referred to as storage nodes 416 as discussed herein). In the example implementation illustrated in FIG. 4B, the control plane nodes 406 draw upon assigned storage nodes 416 within a stacked storage cluster 418.

The control planes 406 make global decisions about each cluster and detect and responds to cluster events, such as initiating a pod when a deployment replica field is unsatisfied. The control plane node 406 components may be run on any machine within a cluster. Each of the control plane nodes 406 includes an API server 408, a controller manager 410, and a scheduler 412.

The API server 408 functions as the front end of the control plane node 406 and exposes an Application Program Interface (API) to access the control plane node 406 and the compute and storage resources managed by the control plane node 406. The API server 408 communicates with the storage nodes 416 spread across different clusters. The API server 408 may be configured to scale horizontally, such that it scales by deploying additional instances. Multiple instances of the API server 408 may be run to balance traffic between those instances.

The controller manager 410 embeds core control loops associated with the system 400. The controller manager 410 watches the shared state of a cluster through the API server 408 and makes changes attempting to move the current state of the cluster toward a desired state. The controller manager 410 may manage one or more of a replication controller, endpoint controller, namespace controller, or service accounts controller.

The scheduler 412 watches for newly created pods without an assigned node, and then selects a node for those pods to run on. The scheduler 412 accounts for individual and collective resource requirements, hardware constraints, software constraints, policy constraints, affinity specifications, anti-affinity specifications, data locality, inter-workload interference, and deadlines.

The storage nodes 416 function as a distributed storage resources with backend service discovery and database. The storage nodes 416 may be distributed across different physical or virtual machines. The storage nodes 416 monitor changes in clusters and store state and configuration data that may be accessed by a control plane node 406 or a cluster. The storage nodes 416 allow the system 400 to support discovery service so that deployed applications can declare their availability for inclusion in service.

In some implementations, the storage nodes 416 are organized according to a key-value store configuration, although the system 400 is not limited to this configuration. The storage nodes 416 may create a database page for each record such that the database pages do not hamper other records while updating one. The storage nodes 416 may collectively maintain two or more copies of data stored across all clusters on distributed machines.

Figure 5:
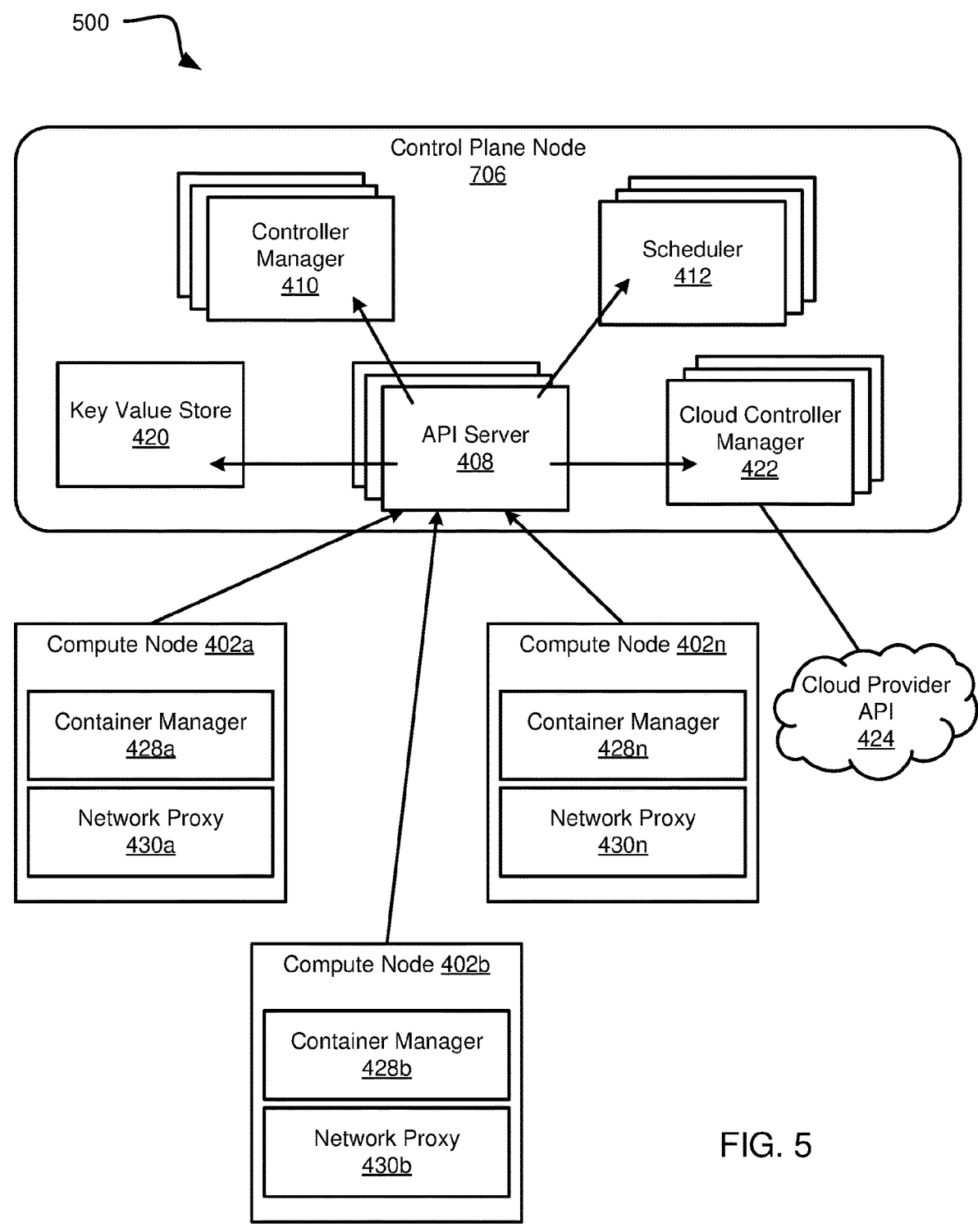
FIG. 5 is a schematic block diagram of an example cluster implemented within a containerized workload management and execution system.

FIG. 5 is a schematic illustration of a cluster 500 for automating deployment, scaling, and management of containerized applications. The cluster 500 illustrated in FIG. 5 is implemented within the systems 400 illustrated in FIGS. 4A-4B, such that the control plane node 406 communicates with compute nodes 402 and storage nodes 416 as shown in FIGS. 4A-4B. The cluster 500 groups containers that make up an application into logical units for management and discovery.

The cluster 500 deploys a cluster of worker machines, identified as compute nodes 402a, 402b, 402n. The compute nodes 402 include one or more bare metal servers 122 that have been provisioned according to the processes described herein. The compute nodes 402a-402n run containerized applications, and each cluster has at least one node. The compute nodes 402a-402n host pods that are components of an application workload. The compute nodes 402a-402n may be implemented as virtual or physical machines, depending on the cluster. The cluster 500 includes a control plane node 406 that manages compute nodes 402a-402n and pods within a cluster. In a production environment, the control plane node 406 typically manages multiple computers and a cluster runs multiple nodes. This provides fault tolerance and high availability.

The key value store 420 is a consistent and available key value store used as a backing store for cluster data. The controller manager 410 manages and runs controller processes. Logically, each controller is a separate process, but to reduce complexity in the cluster 500, all controller processes are compiled into a single binary and run in a single process. The controller manager 410 may include one or more of a node controller, job controller, endpoint slice controller, or service account controller.

The cloud controller manager 422 embeds cloud-specific control logic. The cloud controller manager 422 enables clustering into a cloud provider API 424 and separates components that interact with the cloud platform from components that only interact with the cluster. The cloud controller manager 422 may combine several logically independent control loops into a single binary that runs as a single process. The cloud controller manager 422 may be scaled horizontally to improve performance or help tolerate failures.

The control plane node 406 manages any number of compute nodes 126. In the example implementation illustrated in FIG. 5, the control plane node 406 is managing three nodes, including a first node 126a, a second node 126b, and an nth node 126n (which may collectively be referred to as compute nodes 126 as discussed herein). The compute nodes 126 each include a container manager 428 and a network proxy 430.

The container manager 428 is an agent that runs on each compute node 126 within the cluster managed by the control plane node 406. The container manager 428 ensures that containers are running in a pod. The container manager 428 may take a set of specifications for the pod that are provided through various mechanisms, and then ensure those specifications are running and healthy.

The network proxy 430 runs on each compute node 126 within the cluster managed by the control plane node 406. The network proxy 430 maintains network rules on the compute nodes 126 and allows network communication to the pods from network sessions inside or outside the cluster.

Figure 6:
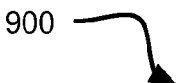
FIG. 6 is a schematic block diagram of a containerized workload management and execution system running on a bare metal server.
Figure 6:
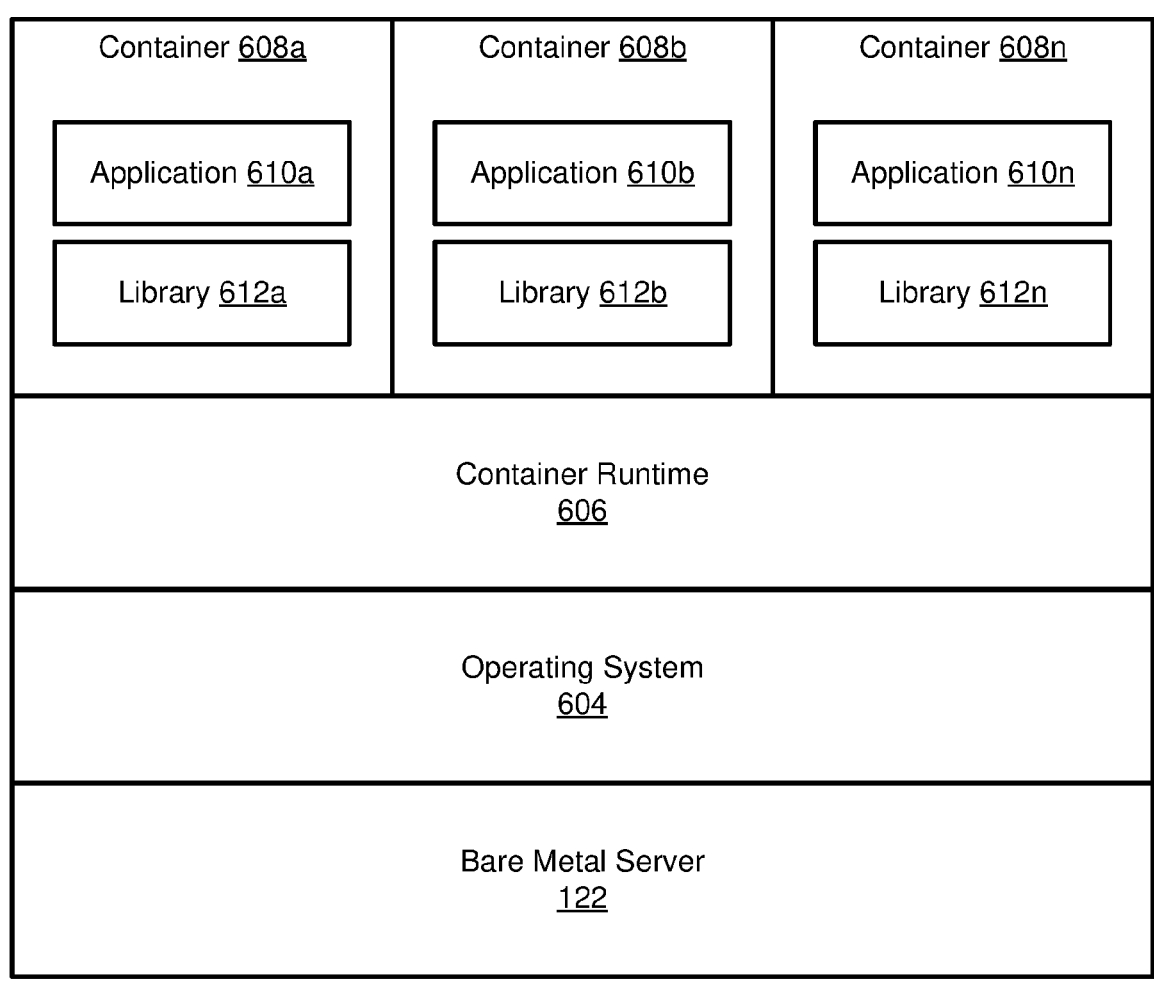

FIG. 6 is a schematic diagram illustrating a system 600 for managing containerized workloads and services. The system 600 includes a provisioned bare metal server 122 that supports an operating system 604 and further includes a container runtime 606, which refers to the software responsible for running containers 608. The bare metal server 122 provides processing and storage resources for a plurality of containers 608a, 608b, 608n that each run an application 610 based on a library 612. The system 600 discussed in connection with FIG. 6 is implemented within the systems 400, 500 described in connection with FIGS. 4A-4B and 5.

The containers 608 function similar to a virtual machine but have relaxed isolation properties and share an operating system 604 across multiple applications 610. Therefore, the containers 608 are considered lightweight. Similar to a virtual machine, a container has its own file systems, share of CPU, memory, process space, and so forth. The containers 608 are decoupled from the underlying instruction and are portable across clouds and operating system distributions.

Containers 608 are repeatable and may decouple applications from underlying host infrastructure. This makes deployment easier in different cloud or OS environments. A container image is a ready-to-run software package, containing everything needed to run an application, including the code and any runtime it requires, application and system libraries, and default values for essential settings. By design, a container 608 is immutable such that the code of a container 608 cannot be changed after the container 608 begins running.

The containers 608 enable certain benefits within the system. Specifically, the containers 608 enable agile application creation and deployment with increased ease and efficiency of container image creation when compared to virtual machine image use. Additionally, the containers 608 enable continuous development, integration, and deployment by providing for reliable and frequent container image build and deployment with efficient rollbacks due to image immutability. The containers 608 enable separation of development and operations by creating an application container at release time rather than deployment time, thereby decoupling applications from infrastructure. The containers 608 increase observability at the operating system-level, and also regarding application health and other signals. The containers 608 enable environmental consistency across development, testing, and production, such that the applications 610 run the same on a laptop as they do in the cloud. Additionally, the containers 608 enable improved resource isolation with predictable application 610 performance. The containers 608 further enable improved resource utilization with high efficiency and density.

The containers 608 enable application-centric management and raise the level of abstraction from running an operating system 604 on virtual hardware to running an application 610 on an operating system 604 using logical resources. The containers 604 are loosely coupled, distributed, elastic, liberated micro-services. Thus, the applications 610 are broken into smaller, independent pieces and can be deployed and managed dynamically, rather than a monolithic stack running on a single-purpose machine.

The system 600 allows users to bundle and run applications 610. In a production environment, users may manage containers 608 and run the applications to ensure there is no downtime. For example, if a singular container 608 goes down, another container 608 will start. This is managed by the control plane nodes 406, which oversee scaling and failover for the applications 610.

Figure 7:
FIG. 7 is a schematic block diagram of a process flow for provisioning a bare metal server and connecting the bare metal server to an orchestration platform.
Figure 7:

FIG. 7 is a schematic diagram of a provisioning process 700 for connecting a bare metal server 122 to the system 100. In the implementation illustrated in FIG. 7, the bare metal server 122 communicates over the 5G RAN 102.

The provisioning process 700 includes provisioning the bare metal server 122 with BIOS (basic input output system) configurations 122, firmware upgrades 706, storage configurations 708, network configurations 710, and an operating system 712. The provisioning process 700 further includes provisioning the bare metal server 122 with RPM, drivers, services, and other configurations 714. The provisioning process 700 includes provisioning the bare metal server 122 with an orchestration platform 716, such as the orchestration server system 124 discussed in connection with FIG. 1. The provisioning process 700 includes installing applications 718 on the bare metal server or configuring the bare metal server 122 to execute the applications 718.

Figure 8A:
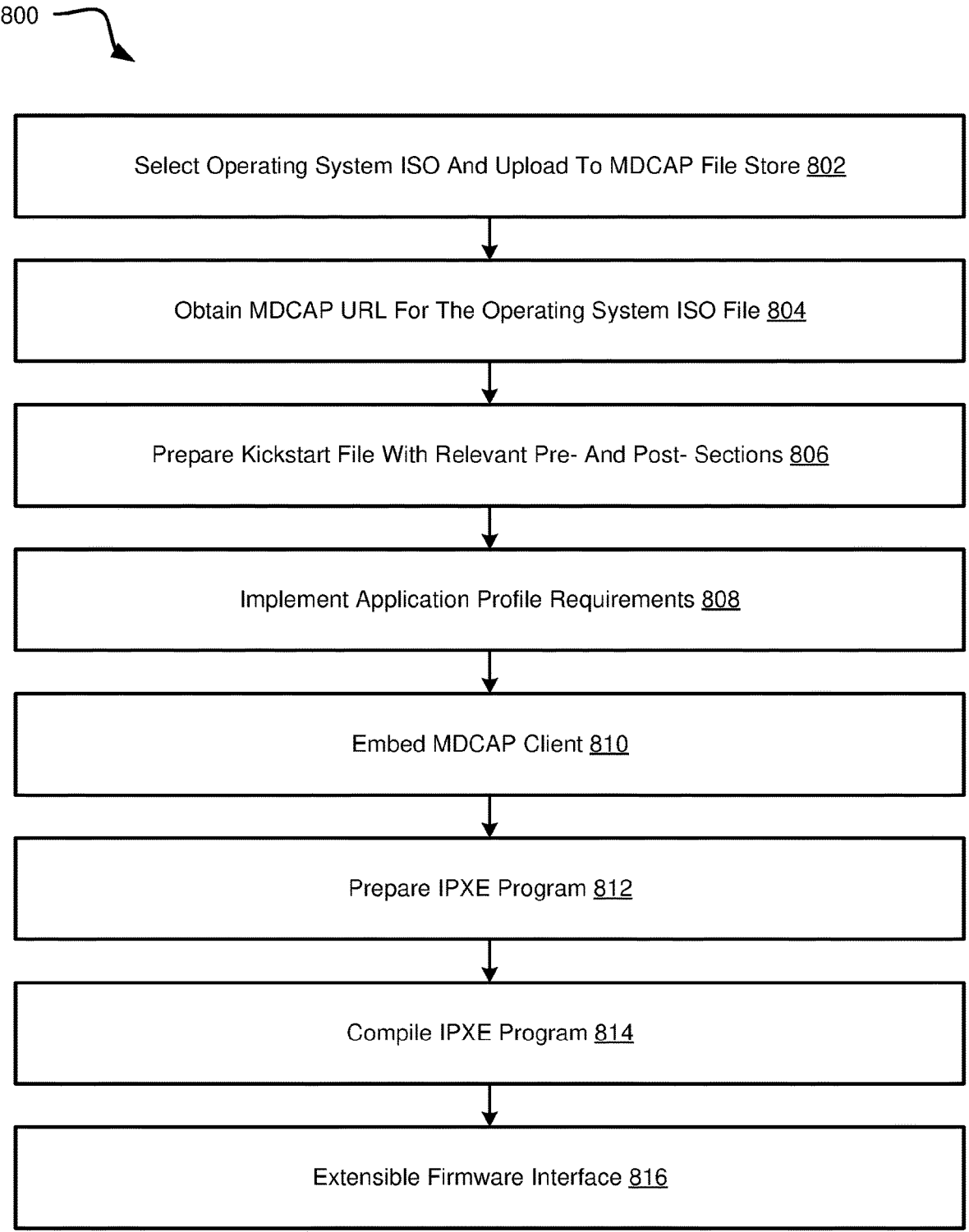

FIGS. 8A and 8B are schematic flow chart diagrams of a process flow 800 for preparing a network boot program (NBP). Network booting or booting from a local area network (LAN), is a process that allows a computer to start up and load an operating system or other program directly from a network without any locally attached storage device. The process flow 800 may be implemented for zero touch provisioning of a bare metal server 122.

The process flow 800 begins with selecting an operating system ISO file and uploading the operating system ISO file to a multi-data center automation platform (MDCAP) file store at 802. The MDCAP 204 is a hyper automated system for orchestrating and managing the life cycles of bare metal servers, third-party appliances, virtual network functions, cloud native network functions, and service chains. The MDCAP 204 includes a built-in logging, monitoring, and policy engine for closed loop automation. The MDCAP 204 enables a user to initiate one-click application and network function onboarding. The MDCAP 204 accelerates infrastructure and service turnup timelines and reduces integration touchpoints and orchestration silos.

The process flow 800 continues with obtaining an MDCAP URL for the ISO file at 804. The MDCAP 204 assigns a URL to the operating system ISO file after the ISO file is uploaded to the MDCAP file store at 802. This URL may be used for zero-touch provisioning of the bare metal server 122.

The process flow 800 continues with preparing a kickstart file with relevant pre- and post-sections at 806. The kickstart file is a simple text file that includes configuration information for the bare metal server 122. The bare metal server 122 will read the kickstart file at boot time and carry out the install process without further input.

The process flow 800 continues with implementing application profile requirements at 808. The application profile requirements are discussed in more detail in connection with FIG. 8B. The process of implementing the application profile requirements at 808 is implemented by each of a RAN vendor distributed unit (DU) profile 818, a RAN vendor central unit (CU) profile 820, and a generic profile 822.

Each of the RAN vendor DU profile 818, the RAN vendor CU profile 820, and the generic profile 822 is configured to configure the BIOS settings at 824, upgrade firmware for hardware components to relevant version at 826, configure storage resources at 828, configure network connections at 830, and install additional RPM, drivers, packages, and services at 834. The RAN vendor DU profile 818 is further configured to install additional real-time operating system packages at 832 and install additional configurations with one-time updates at 836.

The process flow 800 continues with embedding an MDCAP 204 client at 810. The MDCAP 204 client will manage the bare metal server 122 and is configured to install an operating system on the bare metal server 122, and then connect the bare metal server 122 to the orchestration server system 124.

The process flow 800 continues with preparing an iPXE program at 812 and then compiling the iPXE program at 814. The iPXE program include an open-source implementation of the preboot execution environment (PXE) client software and bootloader. The process flow 800 continues with installing an extensible firmware interface (EFI) at 816.

Figure 9:
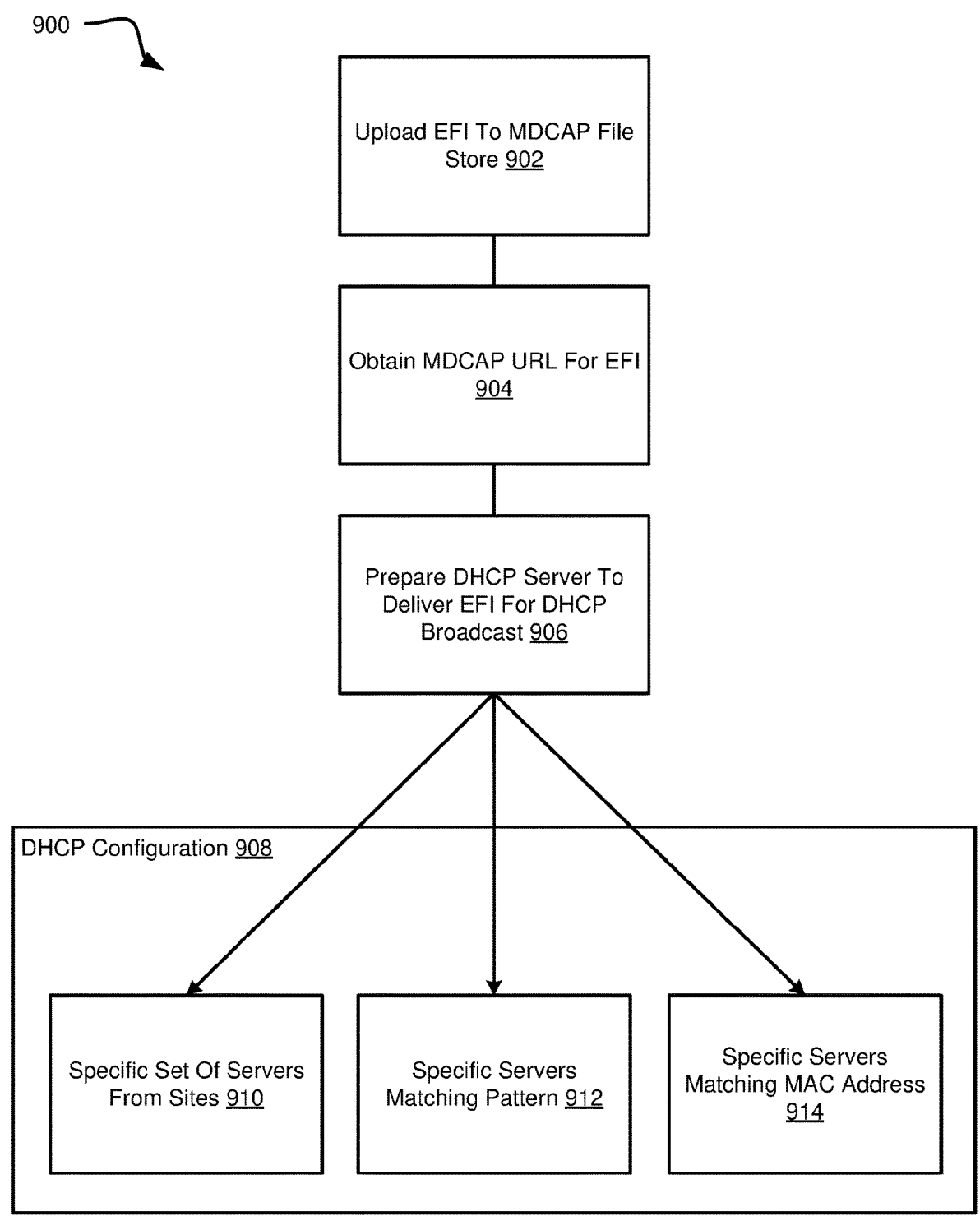
FIG. 9 is a schematic block diagram of a process flow for preparing a DHCP server.

FIG. 9 is a schematic flow chart diagram of a process flow 900 for preparing a DHCP (dynamic host configuration protocol) server. The process flow 900 includes uploading the extensible firmware interface (EFI) to an MDCAP file store at 902 and obtaining an MDCAP URL for the extensible firmware interface at 904. The process flow 900 includes preparing the DHCP server to deliver the extensible firmware interface for DHCP broadcast at 906. The DHCP configuration includes a specific set of servers from sites 910, specific servers matching pattern 912, and specific servers matching MAC address 914.

Figure 10A:
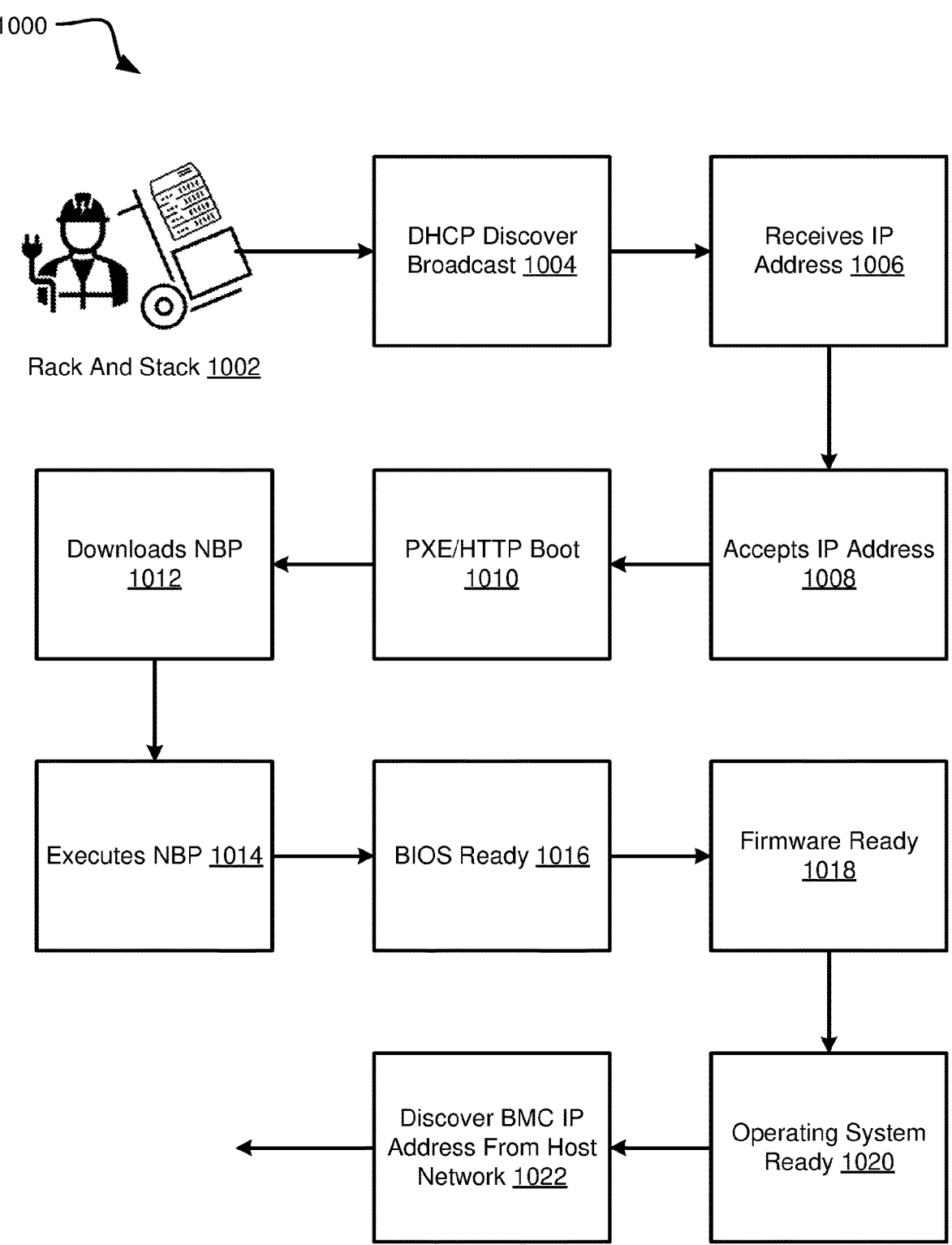
FIGS. 10A and 10B are schematic block diagrams of a process flow for zero touch provisioning of a bare metal server.
Figure 10B:
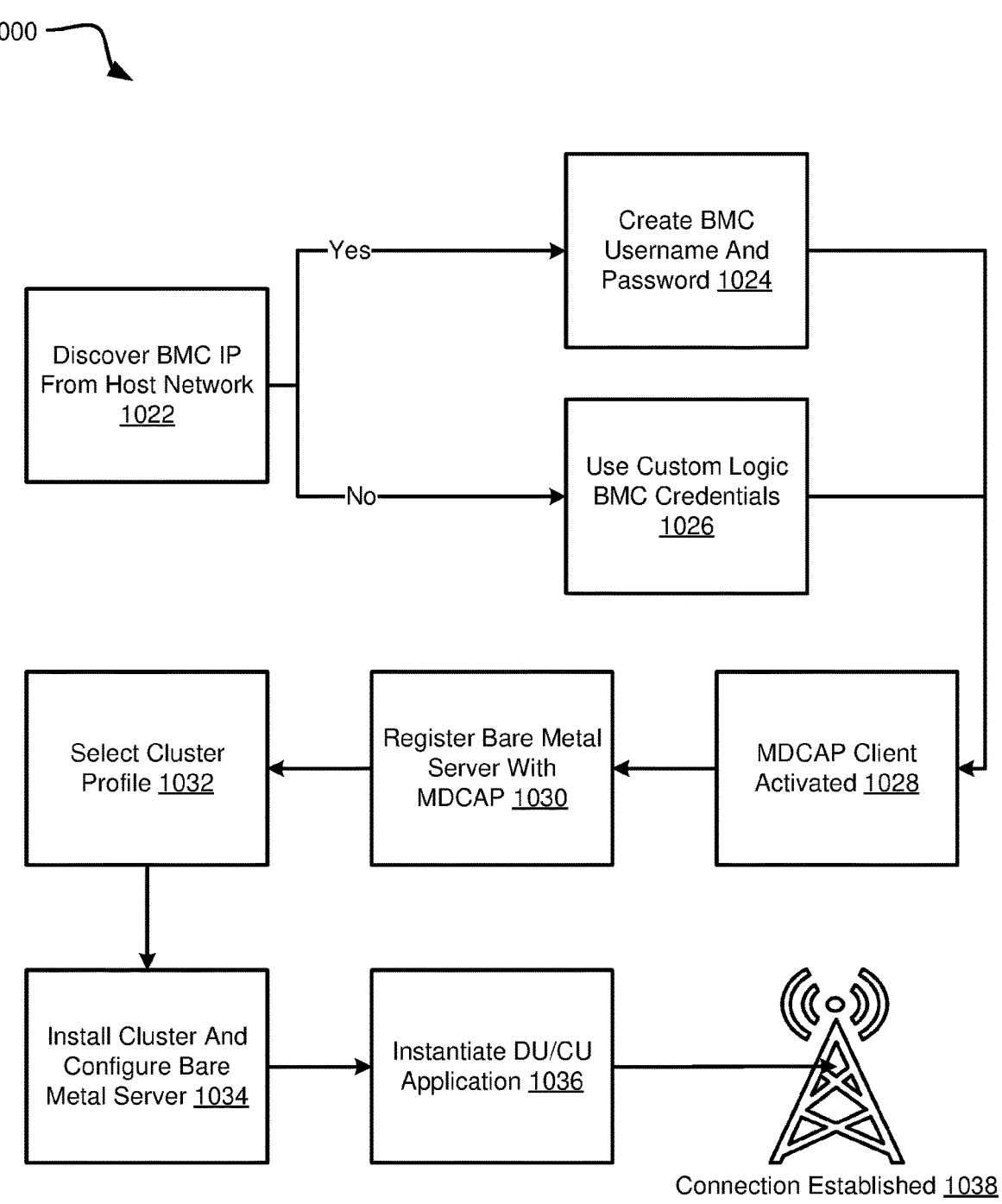

FIGS. 10A and 10B are schematic flow chart diagrams of a process flow 1000 for zero touch provisioning of a bare metal server. The process flow begins with powering on the bare metal server 122 and then provisioning the bare metal server 122 to interface with the distributed unit (DU) and the centralized unit (CU) of the 5GRAN 102. The process flow 1000 is implemented on a completely bare bones bare metal server 122 with no software installed. The process flow 1000 is implemented to bring up, orchestrate, configure, and monitor a cloud native RAN software package simply by connecting the bare metal server 122 to a power cable and LAN cable.

Zero touch provisioning of a bare metal server 122 using preboot execution environment (PXE) is a known concept implemented by products such as COBBLER, FOREMAN, MaaS, and others. However, these existing system provide only a means of installing an operating system on the bare metal server 122. If a client needs the capability of connecting to the 5G RAN 102, then it is highly labor intensive to install a RAN software package in the form of containers or virtual machines. Traditional RAN software packages are complex and require specific settings to various components such as the BIOS, BMC, NICE, FPGA, and other hardware components on the bare metal server 122. Additionally, different RAN vendors have different requirements on hardware, software, and firmware. There is no existing single product capable of orchestrating, configuring, and monitoring the 5G RAN 102 irrespective of server vendor or RAN vendor.

The process flow 1000 illustrated in FIGS. 10A and 10B addresses some of the deficiencies of traditional systems described above. The process flow 1000 includes bringing up, orchestrating, configuring, and monitoring RAN software simply with powering on a bare bones bare metal server 122. The process flow 1000 enables the flexibility to change the RAN vendor on existing servers, server manufactures for existing RAN vendors, and the operating system for business purposes or cost purposes.

The process flow 1000 may specifically be implemented for zero touch provisioning of a bare metal server 122 to communicate over a 5G network. The 5G base transceiver station (BTS) (see antennas and base station 104 discussed in connection with FIG. 1) is divided into two physical entities, including the centralized unit and the distributed unit. The centralized unit provides support for higher layers of a protocol stack, such as SDAP (service data adaption protocol), PDCP (packet data convergence protocol), and RRC (radio resource control). The distributed unit provides support of lower layers of a protocol stack, such as RLC (radio link control), MAC (medium access control), and the physical layer.

The process flow 1000 begins with a bare metal server 122 being racked and stacked at 1002. The rack and stack 1002 process include mounting the bare metal server 122 equipment (racked) before moving the equipment to a data center for deployment (stacked). The process flow 1000 continues with DHCP discover broadcast 1004 to identify a DHCP server capable of delivering a network boot program (see FIGS. 8A and 8B) to the bare metal server 122. The process flow 1000 continues with receiving an IP address for the bare metal server 122 at 1006 and then accepting the IP address at 1008.

The process flow 1000 continues with executing a PXE boot over HTTP at 1010. The preboot execution environment (PXE) is a standardized client-server environment that boots a software assembly, retrieved from a network, on PXE-enabled clients. On the client side it requires only a PXE-capable network interface controller (NIC) and uses a small set of industry-standard network protocols such as DHCP and TFTP. The process flow 1000 continues with downloading the network boot program at 1012 and then executing the network boot program at 1014. The network boot program executed by the bare metal server 122 may specifically include the network boot program described in FIGS. 8A and 8B.

The process flow 1000 continues and the BIOS on the bare metal server 122 is ready at 1016, and then the firmware is ready at 1018, and then the operating system is ready at 1020. The process flow 1000 includes discovering the BMC IP address from a host network at 1022. If the BMC IP address is discovered at 1022, then a BMC username and password is created at 1024. If the BMC IP address is not discovered at 1022, then custom logic is used to create BMC credentials at 1026.

The process flow 1000 continues and the MDCAP 204 client is activated at 1028, and then the bare metal server is registered with the MDCAP 204 at 1030. The process flow 1000 includes selecting a cluster profile 1032 within a containerized workload management system, and then installing the cluster and configuring the bare metal server at 1034. The process flow 1000 continues with instantiating the DU/CU application at 1036 for communicating with the 5G RAN 102. Finally, the connection between the bare metal server 122 and the 5G RAN 102 is established at 1038.

Figure 11:
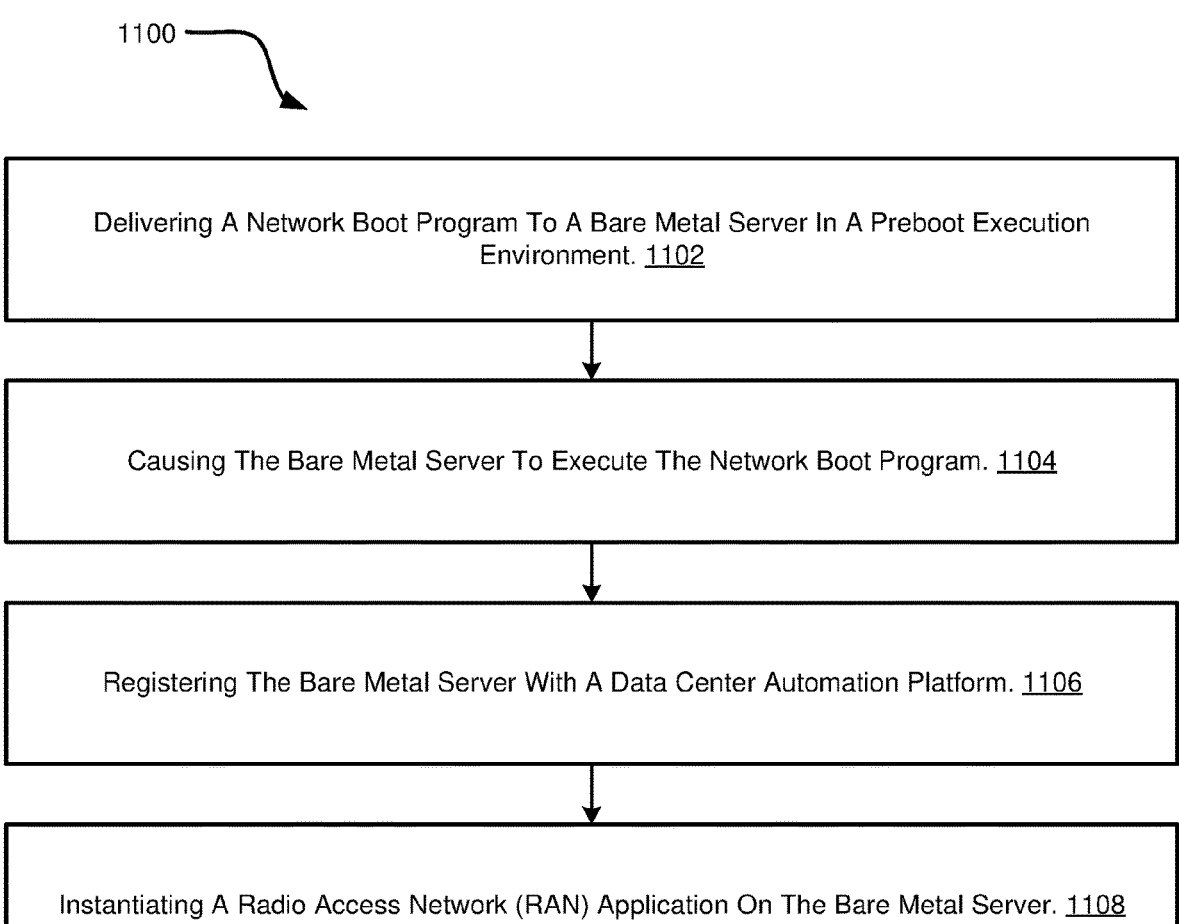
FIG. 11 is a schematic flow chart diagram of a method for zero touch provisioning of a bare metal server.

FIG. 11 is a schematic flow chart diagram of a method 1100 for zero touch provisioning of a bare metal server. The method 1100 includes delivering at 1102 a network boot program to a bare metal server 122 in a preboot execution environment (PXE). The method 1100 includes causing at 1104 the bare metal server 122 to execute the network boot program. The method 1100 includes registering at 1106 the bare metal server with a data center automation platform, such as the MIDCAP 204. The method 1100 includes instantiating at 1108 a radio access network (RAN) application on the bare metal server 122.

Figure 12:
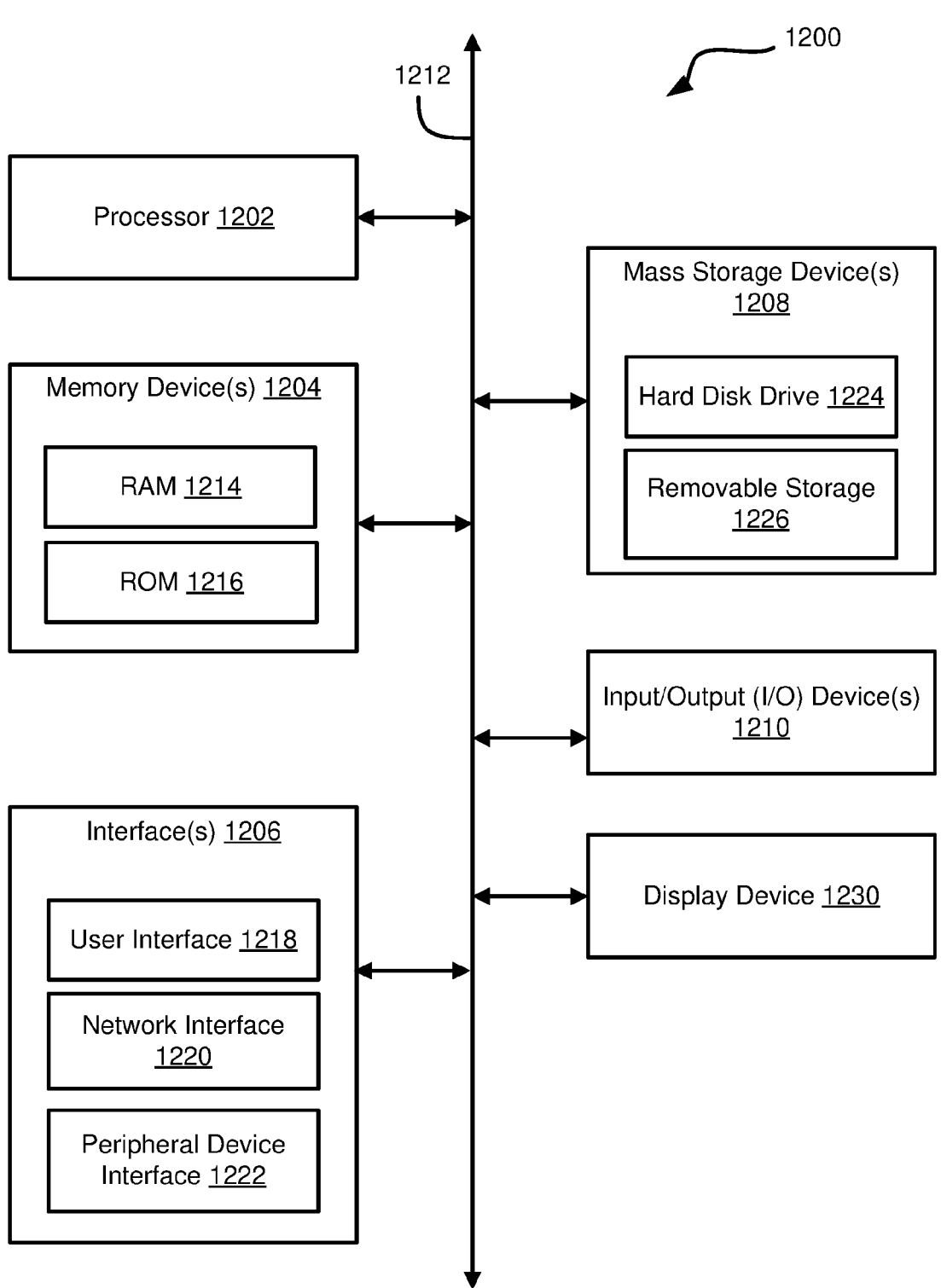
FIG. 12 is a schematic block diagram of an example computing device suitable for implementing methods in accordance with embodiments of the invention.

FIG. 12 illustrates a schematic block diagram of an example computing device 1200. The computing device 1200 may be used to perform various procedures, such as those discussed herein. The computing device 1200 can perform various monitoring functions as discussed herein, and can execute one or more application programs, such as the application programs or functionality described herein. The computing device 1200 can be any of a wide variety of computing devices, such as a desktop computer, in-dash computer, vehicle control system, a notebook computer, a server computer, a handheld computer, tablet computer and the like.

The computing device 1200 includes one or more processor(s) 1204, one or more memory device(s) 1204, one or more interface(s) 1206, one or more mass storage device(s) 1208, one or more Input/output (I/O) device(s) 1210, and a display device 1230 all of which are coupled to a bus 1212. Processor(s) 1204 include one or more processors or controllers that execute instructions stored in memory device(s) 1204 and/or mass storage device(s) 1208. Processor(s) 1204 may also include several types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 12, a particular mass storage device 1208 is a hard disk drive 1224. Various drives may also be included in mass storage device(s) 1208 to enable reading from and/or writing to the various computer readable media. Mass storage device(s) 1208 include removable media 1226 and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 may include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more user interface elements 1218. The interface(s) 1206 may also include one or more peripheral interfaces such as interfaces for printers, pointing devices (mice, track pad, or any suitable user interface now known to those of ordinary skill in the field, or later discovered), keyboards, and the like.

Bus 1212 allows processor(s) 1204, memory device(s) 1204, interface(s) 1206, mass storage device(s) 1208, and I/O device(s) 1210 to communicate with one another, as well as other devices or components coupled to bus 1212. Bus 1212 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 1200 and are executed by processor(s) 1202. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to preferred features of further embodiments:

Example 1 is a method for zero touch provisioning of a bare metal server. The method includes delivering a network boot program to a bare metal server in a preboot execution environment and causing the bare metal server to execute the network boot program. The method includes registering the bare metal server with a data center automation platform. The method includes instantiating a radio access network (RAN) application on the bare metal server.

Example 2 is a method as in Example 1, wherein the radio access network application comprises a plurality of functional units comprising: a distributed unit; and a centralized unit.

Example 3 is a method as in any of Examples 1-2, wherein the distributed unit provides support for lower layers of a protocol stack for enabling the bare metal server to communicate over a 5G network, and wherein the lower layers of the protocol stack comprise radio link control (RLC), medium access control (MAC), and a physical layer.

Example 4 is a method as in any of Examples 1-3, wherein the centralized unit provides support for higher layers of a protocol stack for enabling the bare metal server to communicate over a 5G network, and wherein the higher layers of the protocol stack comprise a service data adaptation protocol (SDAP), packet data convergence protocol (PDCP), and a radio resource control (RRC).

Example 5 is a method as in any of Examples 1-4, further comprising: causing the bare metal server to execute a DHCP (dynamic host configuration protocol) server discover broadcast to locate a DHCP server; and receiving an IP (Internet protocol) address for the bare metal server from the DHCP server.

Example 6 is a method as in any of Examples 1-5, wherein delivering the network boot program to the bare metal server comprises: causing the DHCP server to provide the network boot program to the bare metal server when the bare metal server is in the preboot execution environment; and causing the bare metal server to download the network boot program from the bare metal server.

Example 7 is a method as in any of Examples 1-6, wherein the network boot program comprises: a radio access network vendor distributed unit profile; and a radio access network vendor centralized unit profile.

Example 8 is a method as in any of Examples 1-7, wherein each of the radio access network vendor distributed unit profile and the radio access network vendor centralized unit profile comprises instructions for: configuring a basic input/output system (BIOS) on the bare metal server; upgrading firmware for hardware components of the bare metal server; configurating storage on the bare metal server; and configuring a network on the bare metal server.

Example 9 is a method as in any of Examples 1-8, further comprising preparing the network boot program, wherein preparing the network boot program comprises: selecting an operating system ISO file for the bare metal server; uploading the operating system ISO file to a file store for the data center automation platform; and obtaining a URL for the operating system ISO file, wherein the URL is generated by the data center automation platform.

Example 10 is a method as in any of Examples 1-9, wherein preparing the network boot program further comprises: preparing a kickstart file that comprises configuration information for the bare metal server; and embedding a client of the data center automation platform into the network boot program.

Example 11 is a method as in any of Examples 1-10, further comprising triggering a workflow to connect the bare metal server to cloud native platform, wherein the data center automation platform is a component of the cloud native platform.

Example 12 is a method as in any of Examples 1-11, wherein the cloud native platform comprises a plurality of clusters in a containerized workload management system, and wherein each of the plurality of clusters comprises: a control plane node; and a plurality of compute nodes in communication with the control plane node.

Example 13 is a method as in any of Examples 1-12, wherein connecting the bare metal server to the cloud native platform comprises connecting the bare metal server to at least one of the plurality of clusters; and wherein the bare metal server is configured as a compute node for executing applications for the at least one of the plurality of clusters.

Example 14 is a method as in any of Examples 1-13, wherein the radio access network application is a 5G radio access network application.

Example 15 is a method as in any of Examples 1-14, wherein the method is executed in response to racking and stacking a bare bones version of the bare metal server; and wherein the method is a means for zero touch provisioning of the bare metal server.

Example 16 is a method as in any of Examples 1-15, further comprising preparing the network boot program, wherein preparing the network boot program comprises: customizing the network boot program to accommodate a radio access network vendor that will facilitate communications between the bare metal server and a 5G network; customizing the network boot program based on a manufacturer of the bare metal server; and selecting an operating system to be installed on the bare metal server.

Example 17 is a method as in any of Examples 1-16, wherein causing the bare metal server to execute the network boot program comprises: installing basic input/output system (BIOS) configurations on the bare metal server by way of a network connection; installing one or more firmware upgrades on the bare metal server by way of the network connection; installing a storage configuration on the bare metal server by way of the network connection; and installing a network configuration on the bare metal server by way of the network connection.

Example 18 is a method as in any of Examples 1-17, wherein causing the bare metal server to execute the network boot program further comprises installing an operating system on the bare metal server by way of the network connection.

Example 19 is a method as in any of Examples 1-18, wherein causing the bare metal server to execute the network boot program further comprises connecting the bare metal server to an orchestration platform, wherein the orchestration platform is executed by one or more processors configured to: facilitate deployment of the bare metal server within a containerized workload management system; and detect and initialize hardware within the containerized workload management system; wherein the data center automation platform is a component of the same containerized workload management system as the orchestration platform.

Example 20 is a method as in any of Examples 1-19, wherein the network connection is a cable connection from the bare metal server to one or more of a local area network (LAN) or wide area network (WAN).

Example 21 is a system including one or more processors each configured to execute instructions stored in non-transitory computer readable storage medium, the instructions comprising any of the method steps of Examples 1-20.

Example 22 is non-transitory computer readable storage medium storing instructions for execution by one or more processors, the instructions comprising any of the method steps of Examples 1-20.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:

delivering a network boot program to a bare metal server in a preboot execution environment wherein the network boot program comprises a radio access network vendor distributed unit profile and a radio access network vendor centralized unit profile;

causing the bare metal server to execute the network boot program;

registering the bare metal server with a data center automation platform;

configuring the bare metal server according to the radio access network vendor distributed unit profile and the radio access network vendor centralized unit profile; and instantiating a radio access network (RAN) application on the bare metal server.

2. The method of claim 1, wherein the radio access network application comprises a plurality of functional units comprising:

a distributed unit; and a centralized unit.

3. The method of claim 2, wherein the distributed unit provides support for lower layers of a protocol stack for enabling the bare metal server to communicate over a 5G network, and wherein the lower layers of the protocol stack comprise radio link control (RLC), medium access control (MAC), and a physical layer.

4. The method of claim 2, wherein the centralized unit provides support for higher layers of a protocol stack for enabling the bare metal server to communicate over a 5G network, and wherein the higher layers of the protocol stack comprise a service data adaptation protocol (SDAP), packet data convergence protocol (PDCP), and a radio resource control (RRC).

5. The method of claim 1, further comprising:

causing the bare metal server to execute a DHCP (dynamic host configuration protocol) server discover broadcast to locate a DHCP server; and receiving an IP (Internet protocol) address for the bare metal server from the DHCP server.

6. The method of claim 5, wherein delivering the network boot program to the bare metal server comprises:
  causing the DHCP server to provide the network boot program to the bare metal server when the bare metal server is in the preboot execution environment; and
  causing the bare metal server to download the network boot program from the DHCP server.

7. The method of claim 1, wherein each of the radio access network vendor distributed unit profile and the radio access network vendor centralized unit profile comprises instructions for:
  configuring a basic input/output system (BIOS) on the bare metal server;
  upgrading firmware for hardware components of the bare metal server;
  configurating storage on the bare metal server; and
  configuring a network on the bare metal server.

8. The method of claim 1, further comprising preparing the network boot program, wherein preparing the network boot program comprises:
  selecting an operating system ISO file for the bare metal server;
  uploading the operating system ISO file to a file store for the data center automation platform; and
  obtaining a URL for the operating system ISO file, wherein the URL is generated by the data center automation platform.

9. The method of claim 8, wherein preparing the network boot program further comprises:
  preparing a kickstart file that comprises configuration information for the bare metal server; and
  embedding a client of the data center automation platform into the network boot program.

10. The method of claim 1, further comprising triggering a workflow to connect the bare metal server to a cloud native platform, wherein the data center automation platform is a component of the cloud native platform.

11. The method of claim 10, wherein the cloud native platform comprises a plurality of clusters in a containerized workload management system, and wherein each of the plurality of clusters comprises:
  a control plane node; and
  a plurality of compute nodes in communication with the control plane node.

12. The method of claim 11, wherein connecting the bare metal server to the cloud native platform comprises connecting the bare metal server to at least one of the plurality of clusters; and
  wherein the bare metal server is configured as a compute node for executing applications for the at least one of the plurality of clusters.

13. The method of claim 1, wherein the radio access network application is a 5G radio access network application.

14. The method of claim 1, wherein the method is executed in response to racking and stacking a bare bones version of the bare metal server; and
  wherein the method is a means for zero touch provisioning of the bare metal server.

15. The method of claim 1, further comprising preparing the network boot program, wherein preparing the network boot program comprises:
  customizing the network boot program to accommodate a radio access network vendor that will facilitate communications between the bare metal server and a 5G network;
  customizing the network boot program based on a manufacturer of the bare metal server; and
  selecting an operating system to be installed on the bare metal server.

16. The method of claim 1, wherein causing the bare metal server to execute the network boot program comprises:
  installing basic input/output system (BIOS) configurations on the bare metal server by way of a network connection;
  installing one or more firmware upgrades on the bare metal server by way of the network connection;
  installing a storage configuration on the bare metal server by way of the network connection; and
  installing a network configuration on the bare metal server by way of the network connection.

17. The method of claim 16, wherein causing the bare metal server to execute the network boot program further comprises installing an operating system on the bare metal server by way of the network connection.

18. The method of claim 17, wherein causing the bare metal server to execute the network boot program further comprises connecting the bare metal server to an orchestration platform, wherein the orchestration platform is executed by one or more processors configured to:
  facilitate deployment of the bare metal server within a containerized workload management system; and
  detect and initialize hardware within the containerized workload management system;
  wherein the data center automation platform is a component of the same containerized workload management system as the orchestration platform.

19. The method of claim 17, wherein the network connection is a cable connection from the bare metal server to one or more of a local area network (LAN) or wide area network (WAN).

* * * * *